United States Patent [19]

Green

[11] Patent Number: 4,937,599

[45] Date of Patent: Jun. 26, 1990

[54] VARIABLE CONFIGURATION TIME CLOCK

[75] Inventor: David L. Green, Fort Myers, Fla.

[73] Assignee: Tempustech, Inc., Fort Myers Beach, Fla.

[21] Appl. No.: 195,711

[22] Filed: May 18, 1988

[51] Int. Cl.$^5$ ............... G01D 13/00; G06C 15/00; H02G 13/18

[52] U.S. Cl. ............... 346/145; 346/82; 174/59; 235/377; 235/419

[58] Field of Search ............... 346/82, 145; 235/377, 235/419, 375; 174/59

[56] References Cited

U.S. PATENT DOCUMENTS

| | | | |
|---|---|---|---|
| 4,270,043 | 5/1981 | Baxter et al. | 235/419 |
| 4,323,771 | 4/1982 | Chalker, Jr. et al. | 235/377 |
| 4,333,085 | 6/1982 | Witts | 346/76 PH |
| 4,358,777 | 11/1982 | Bille | 346/82 |
| 4,578,702 | 3/1986 | Campbell, III | 358/86 |
| 4,603,335 | 7/1986 | Koyasu | 346/17 |
| 4,672,182 | 6/1987 | Hirokawa | 235/436 |

Primary Examiner—Bruce A. Reynolds
Assistant Examiner—Gerald E. Preston
Attorney, Agent, or Firm—Charles J. Prescott; Raymond H. Qusit

[57] ABSTRACT

A time clock housing has a back plane circuit providing parallel circuit connections between identical pins on a plurality of circuit board connectors mounted on the back plane. This permits mounting any circuit board to any connector. The time clock includes a basic configuration of components as follows: a power supply, a floppy disk controller, a central processing unit, a ROM, a RAM, a real time clock having its own battery, an input/output circuit, an interface circuit, a keypad, a card reader, a liquid crystal display and an internal printer. The time clock optionally includes components as follows: a backup battery, a hard disk controller and hard disk, a video display circuit, a modem and a local area network circuit. Connectors may also be provided for connecting other devices to the time clock to enter data or receive data.

9 Claims, 2 Drawing Sheets

VARIABLE CONFIGURATION TIME CLOCK

BACKGROUND OF THE INVENTION

1. Field of the Invention

This invention relates generally to time clocks and more particularly to time clocks having a chassis which facilitates producing different functional configurations.

Contemporary time clocks perform many functions in addition to providing a record of the times at which employees punch in and out. Generally, the hours worked, tardiness, overtime, etc. are developed as a result of the time clock entries and provided in a format compatible with the employer's computer system. Some information is displayed at the time clock, while other information is recorded in a form to facilitate its use in the data processing system of the employer.

The diversity of information desired by different employers, together with the various computer systems in use, preclude a single time clock configuration of universal utility. On the other hand, it is not economically practical to custom design and build a time clock specifically for a single employer's needs. Thus there is a need for a time clock structure which can be readily adapted to fit the needs of various employers.

2. Description of Related Art

U.S. Pat. No. 4,603,335, Koyasu, entitled: "Time Recorder for Vertical and Horizontal Use", discloses a time recorder which can be configured for either vertical or horizontal mounting.

U.S. Pat. No. 4,333,085, Witts, entitled: "Time Recorder", discloses a time recorder utilizing plug-in circuit boards.

U.S. Pat. No. 4,270,043, Baxter et al., entitled: "Methods of and Apparatus for Time Clock Recording and Computation and Related Uses", discloses a time clock utilizing various plug-in components.

Although the foregoing structures provide a degree of flexibility they do not provide a structure designed to accomodate the needs of various employers having diverse data processing needs.

It is therefore an object of this invention to provide a time clock having a chassis which facilitates configuring a time clock to meet the needs of various employers. A "chassis" is defined in Webster's Third New International Dictionary of the English Language Unabridged as: "2 a : the frame upon which is mounted the body (as of an automobile or airplane), the working parts (as of a radio or other electronic device), * b : the frame and working parts as opposed to the body (as of an automobile) or cabinet (as of a radio or television set) *".

It is also an object of this invention to provide time clock configurations including optional functions.

It is also an object of this invention to provide a time clock incorporating a floppy disk controller.

In accordance with these and other objects, which will become apparent hereafter, the instant invention will be described with reference to the accompanying drawings.

SUMMARY OF THE INVENTION

A time clock chassis is configured to have mounted therein and electrically connected, time clock components. Provision is made for a minimum time clock configuration providing basic time clock functions. This minimum configuration still permits variation in the components, such as different types of card readers. Provision is also made for adding a number of supplementary functions. A main housing has mounted therein a back plane including a plurality of circuit board connectors. Each connector has identical pin connections electrically connected to identical pin connections of all other connectors permitting any circuit board to be installed in any connector. A floppy disk controller is included in the time card to facilitate searching and storage of recorded data.

DETAILED DESCRIPTION OF THE INVENTION

Figure 1:
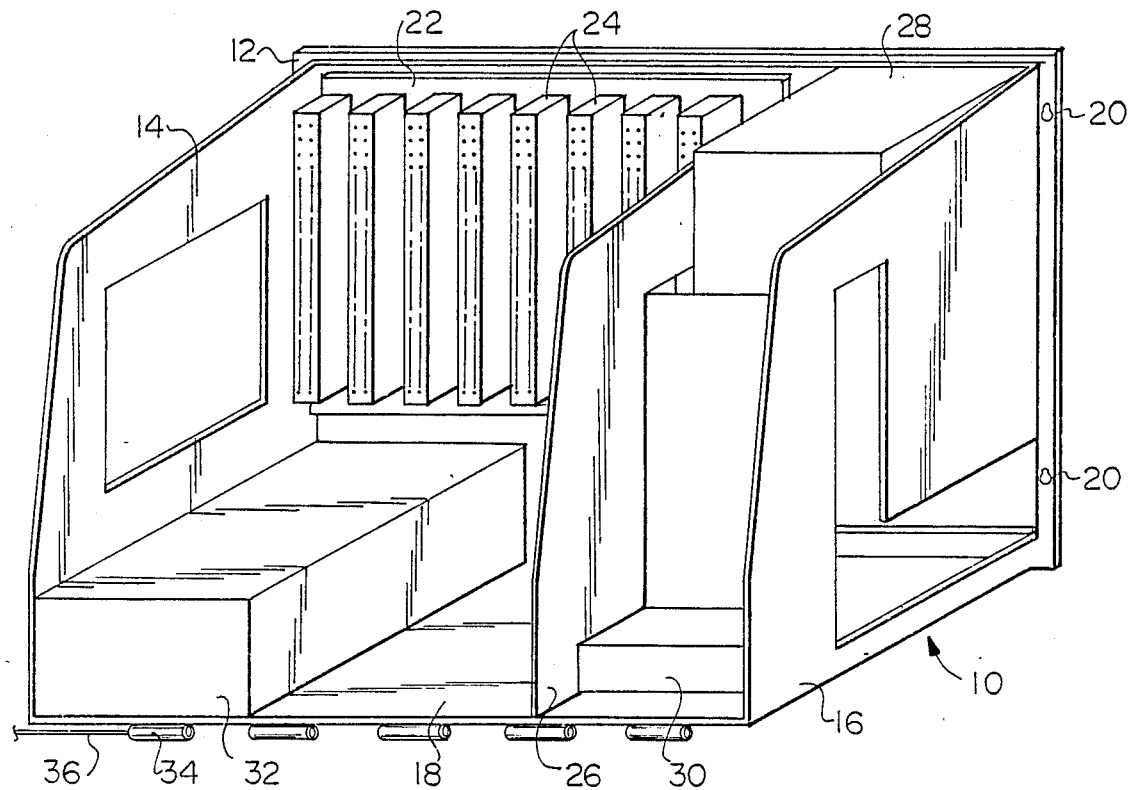
FIG. 1 is an isometric of the main housing of a time clock in accordance with the invention.
Figure 2:
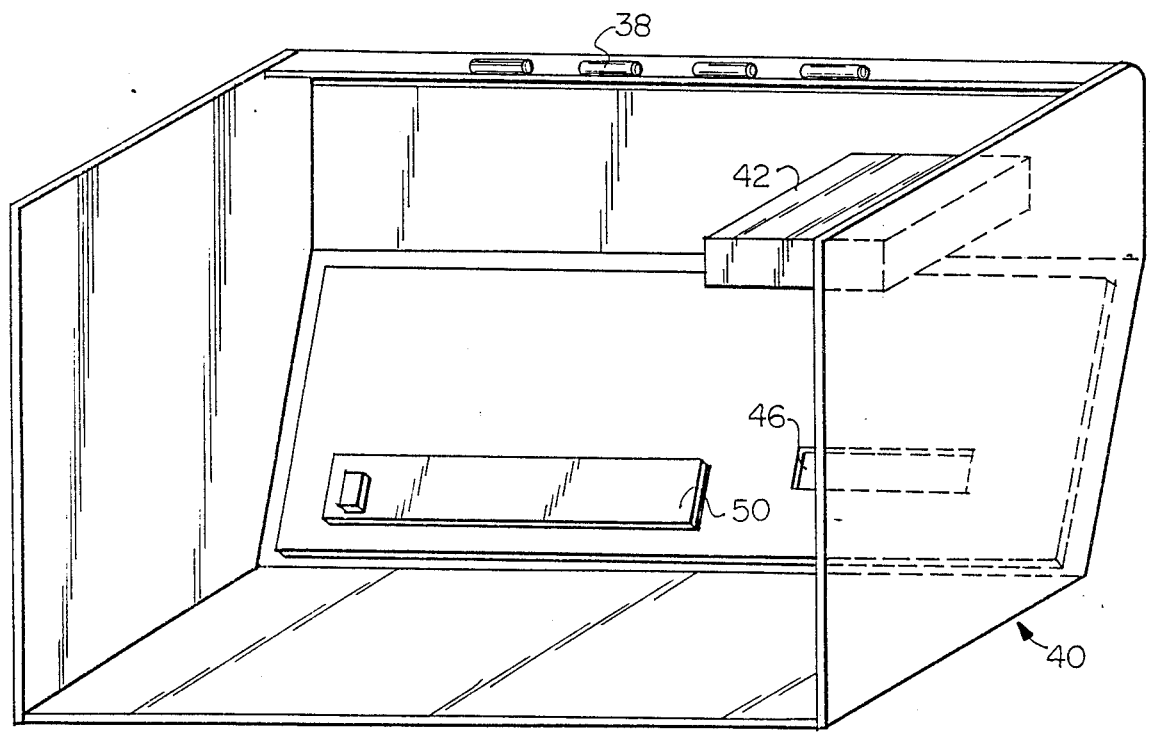
FIG. 2 is an isometric of the cover of the main housing of FIG. 1 in open position.
Figure 3:
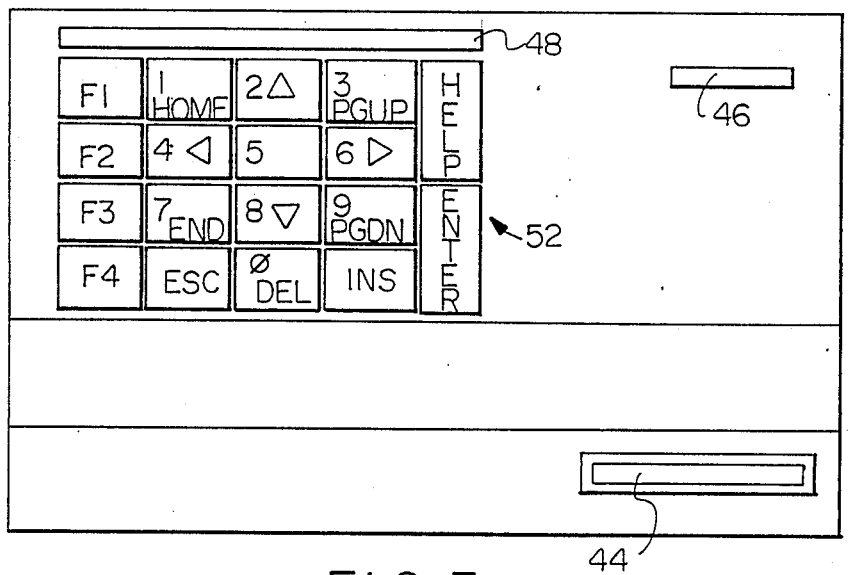
FIG. 3 is a front elevation of the cover of FIG. 2 in closed position.

Referring to FIGS. 1, 2 and 3, a time clock chassis in accordance with the invention is disclosed. A main housing 10 includes back wall 12, side walls 14 and 16, and base 18. Located in back wall 12 are mounting holes 20 which permit installation of the time clock on a wall. Secured to back wall 12 is back plane 22 having electrically and mechanically connected thereto a plurality of circuit board connectors 24. Each connector 24 has a plurality of pin connections with which the pin connections on a circuit board will mate. Moreover, the pin connection in a particular location on one connector 24 is electrically connected to the pin connection in the same location on each of the other connectors 24 by circuitry on back plane 22. Consequently, any circuit board which is to be connected to a connector 24, can be connected to any one of these connectors.

Main housing 10 also includes intermediate wall 26 which provides structural support, together with side wall 16 to mount a printer therebetween. Also located between intermediate wall 26 and side wall 16 is power supply 28 which includes a rectifier and transformer to provide direct current energy of a desired voltage when the time clock is plugged into a 110 volt alternating current source.

Compartment 30 is open on the bottom of main housing 10 and has receptacles permitting temporary connection of additional devices such as a keyboard, an external printer or a monitor. These devices are not used by employees in the process of punching in or out, but rather by a foreman or other employee who requires access to the recorded information or is to make a special entry.

Main housing 10 also includes hard disk controller 32 having a hard disk therein and may contain a back-up battery.

Hinge members 34 and hinge pin 36 connect main housing 10 to mating hinge members 38 on cover 40, shown in FIG. 2.

Cover 40 also forms part of the time clock chassis. Card reader 42 is mounted on cover 40. The front face of cover 40 shown in FIG. 3, has slot 44 through which an identification card can be entered. In lieu of a card reader which functions by having a card inserted, a reader can be substituted which operates on a swipe action. The identification card may have magnetic coding, Hollerith punches, bar code, etc.

Window 46 permits the employee to read the entry which is printed in response to the reading of his identification card. Window 48 exposes a one line liquid crystal or other display 50 which is mounted on the inside of cover 40.

The outside of cover 40 also includes keypad 52 which permits an employee to enter his number by pressing the appropriate keys if he has forgotten his identification card.

Figure 4:
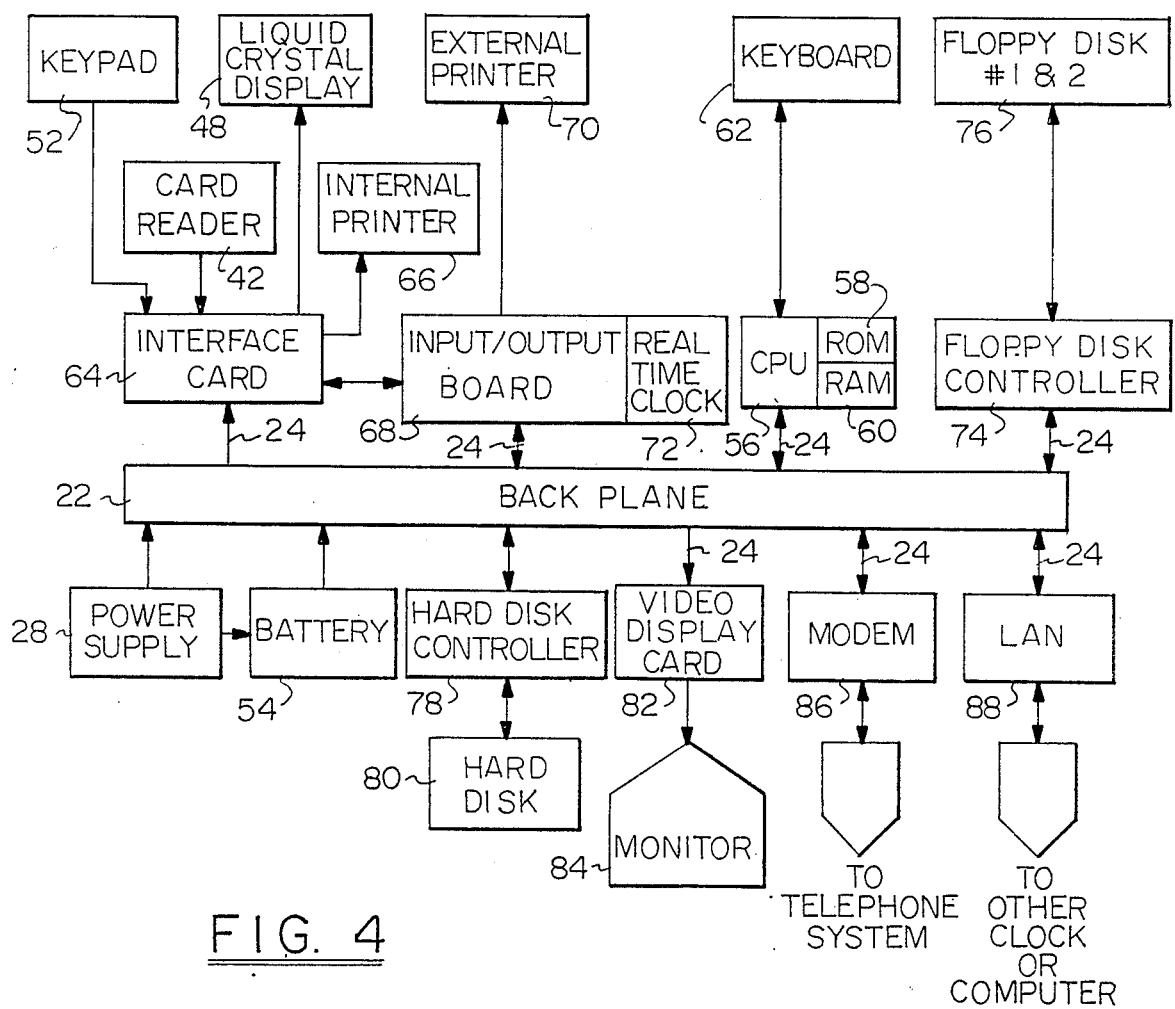
FIG. 4 a block diagram showing components of the time clock system.

Turning now to FIG. 4 the various basic and optional time card components will be described. Back plane 22, it will be recalled, has a plurality of circuit board connectors 24 thereon to permit circuit boards to be installed. FIG. 4 identifies connectors 24 used to connect circuit boards to back plane 22. The remaining connections in FIG. 4 are made by ribbon cables or other plugs and receptacles.

Power supply 28 receives 110 volt alternating current from an external source and converts this power to appropriate direct current voltages. Backup battery 54 is charged by power supply 28 and is provided as a source of power in case of alternating current interruption.

Central processor unit 56, read only memory 58 and random access memory 60 are all on a single card which performs the necessary computations and controls the operation of the time clock system. Keyboard 62 may be optionally plugged into a receptacle in compartment 30 (FIG. 1) in order to access information contained in the time clock memories.

Interface card 64 has a microprocessor and receives data from card reader 42 and keypad 52 which it sends to CPU 56. Interface card 64 also receives data from CPU 56 for display on liquid crystal display 48 or on internal printer 66.

Input/output board 68 allows CPU 56 to connect to external devices such as external printer 70 through a connection in compartment 30. Real time clock 72 is on this board in the form of a chip powered by its own five year battery and serves as the primary time reference. When the time clock is turned on, and periodically thereafter, CPU 56 checks this device to confirm the actual date and time.

Floppy disk controller 74 is also on a plug-in card. Two floppy disks 76 are typically provided. Floppy disk 1 contains the operating routines which are entered onto the hard disk. Floppy disk 2 is used to store data from card reader 42. This permits removal of floppy disk 2 periodically for use at another location and archival storage. Because this is a magnetic media no battery is needed for preservation of the data. Also, this data can be searched rapidly as compared to the printer tape which must be searched manually.

The foregoing represents a basic time clock configuration. Other, optional cards will now be discussed.

Hard disk controller 78 and associated hard disk 80 are used when floppy disk 76 does not provide enough storage for the number of employee punches required by the employer. Because hard disk 80 is not removable, floppy disk 76 is normally installed as well. Hard disk 80 is significantly faster than floppy disk 76 in accessing prior data.

Video display card 82 provides a monochrome or color video display capability permitting external monitor 84 to be plugged in when desired to display many records simultaneously. When a color monitor capability is installed, highlighting of information becomes possible.

Modem card 86 allows the time clock data to be accessed remotely. In a typical situation, an employer can install clocks in multiple widely separated locations. The employee data can then be sent from a central computer to the remote locations. The employee can then clock in or out at any clock, rather than at his "home" clock.

Local area network card 88 allows time clocks which are located relatively close to one another to share resources such as a hard disk or a printer. The time clocks can also be linked to other computers in the company, allowing supervisors to obtain an accurate, real time report, without going to each clock.

A remote access capability becomes more valuable as the number of employees increases because it enables current visibility of the location and activities being performed as well as more ready retrieval of necessary information for payroll and other employee recording keeping.

The various components which are installed in the time clock of this invention are commercially available.

While the instant invention has been shown and described herein in what is conceived to be the most practical and preferred embodiment, it is recognized that departures may be made therefrom within the scope of the invention, which is therefore not to be limited to the details disclosed herein, but is to be afforded the full scope of the claims so as to embrace any and all equivalent apparatus and articles.

I claim:

1. A variable configuration time clock chassis comprising:
    a main housing including a back wall, side walls and a base;
    a back plane mounted in said main housing on said back wall;
    said back plane having first and second circuit board connectors;
    a central processing unit on a circuit board removeably mounted on said first circuit board connector;
    an interface circuit board removeably mounted on said second circuit board connector;
    said back plane having a plurality of additional circuit board connectors for removeably mounting circuit boards thereon;
    each of said circuit board connectors having a plurality of pin connections thereon arranged in identical pin positions on each connector;
    each pin position each connector having a connection to each identical pin position on each other connector.

2. A variable configuration time clock chassis in accordance with claim 1 further including:
    a power supply mounted in said housing.

3. A variable configuration time clock chassis in accordance with claim 1 further including:
    a cover hingedly mounted to said main housing;
    said cover having a data entry device mounted thereon.

4. A variable configuration time clock chassis in accordance with claim 3 wherein:
    said data entry device is a keypad.

5. A variable configuration time clock chassis in accordance with claim 3 wherein:
    said data entry device is a card reader.

6. A variable configuration time clock chassis in accordance with claim 3 further including:
    a display device mounted on said cover.

7. A variable configuration time clock chassis in accordance with claim 1 further including:
  a floppy disk controller on a circuit board removeably mounted on one of said plurality of additional circuit board connectors.

8. A variable configuration time clock chassis comprising:
  a main housing including a back wall, side walls and a base;
  a cover hingedly mounted to said base;
  said cover having a front wall and a top;
  a keypad mounted on said cover front wall;
  a back plane mounted in said main housing on said back wall;
  said back plane having a plurality of identical circuit board connectors for removeably mounting circuit boards thereon;
  each of said circuit board connectors having a plurality of pin connections thereon arranged in identical pin positions on each connector;
  each pin position on each connector having an electrical connection to each identical pin position on each other connector, whereby a circuit board to be removeably mounted in said chassis may be mounted in any of said plurality of circuit board connectors.

9. A variable configuration time clock chassis in accordance with claim 8 further including:
  a power supply mounted in said main housing.

* * * * *

UNITED STATES PATENT AND TRADEMARK OFFICE
CERTIFICATE OF CORRECTION

PATENT NO. : 4,937,599

DATED : June 26, 1990

INVENTOR(S) : David L. Green

It is certified that error appears in the above-identified patent and that said Letters Patent is hereby corrected as shown below:

In the Claims:

Col. 4, Claim 1, Line 35, after "plane" insert -- having a time clock controller and --.

Col. 5, Claim 8, Line 15, after "plane" insert -- connected with a time clock controller and --.

Signed and Sealed this

Third Day of September, 1991

Attest:

HARRY F. MANBECK, JR.

Attesting Officer

Commissioner of Patents and Trademarks